(No Model.)
A. NEELY.
SEED PLANTER.
No. 473,124. Patented Apr. 19, 1892.
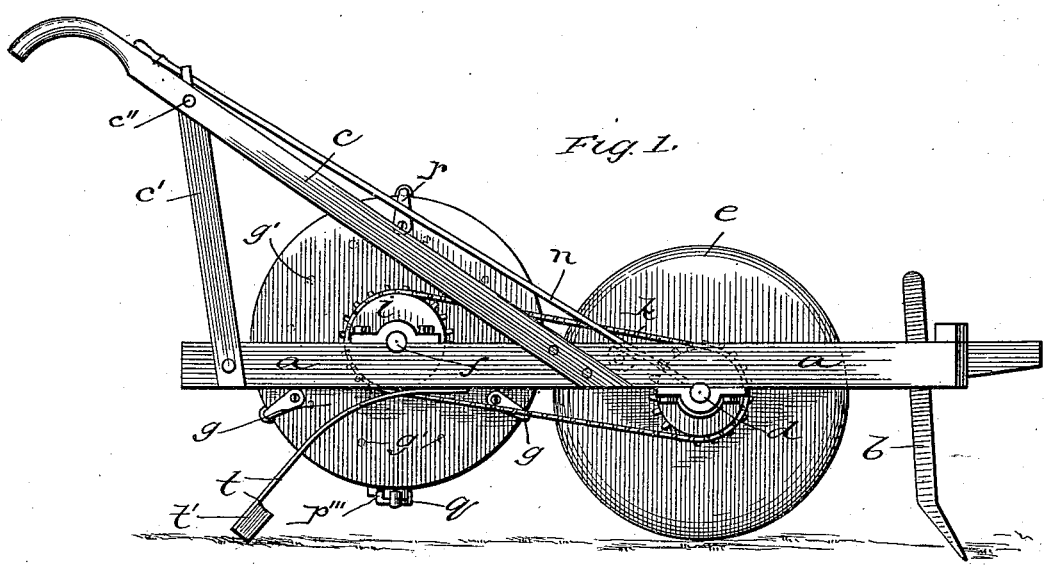
Fig. 1.
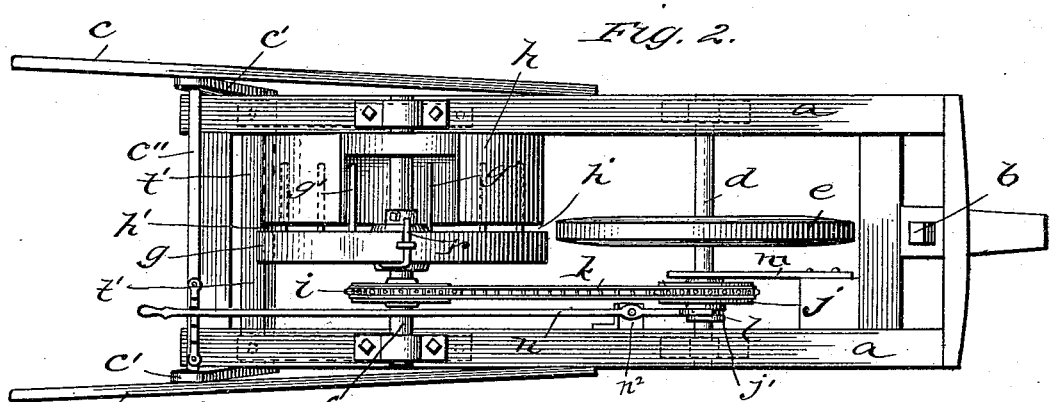
Fig. 2.
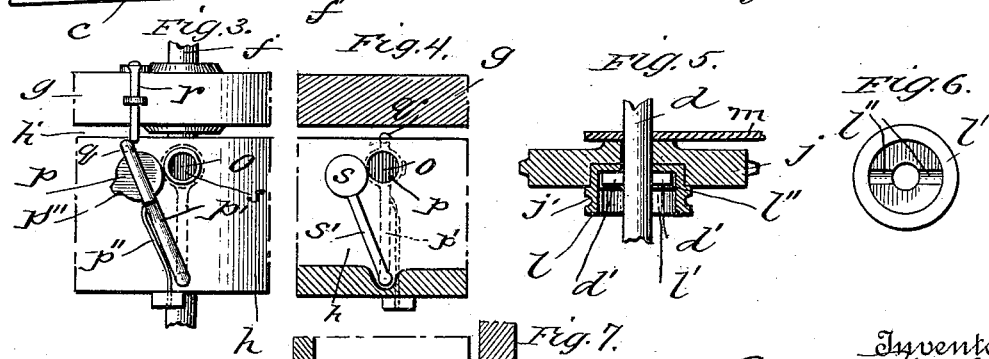
Fig. 3. Fig. 4. Fig. 5. Fig. 6.
Fig. 7.
Witnesses
Inventor
Austin Neely
By Alexander Davis
Attorney

UNITED STATES PATENT OFFICE.

AUSTIN NEELY, OF GREENVILLE, MISSISSIPPI.

SEED-PLANTER.

SPECIFICATION forming part of Letters Patent No. 473,124, dated April 19, 1892.

Application filed January 15, 1892. Serial No. 418,137. (No model.)

*To all whom it may concern:*

Be it known that I, AUSTIN NEELY, a citizen of the United States, residing at Greenville, in the county of Washington and State of Mississippi, have invented certain new and useful Improvements in Seed-Planters, of which the following is a specification, reference being had therein to the accompanying drawings.
This invention relates to certain new and useful improvements in cotton-seed and corn planters; and it has for its object to provide a machine of simple construction which will be positive and efficient in operation.
The invention consists in the novel combination and arrangement of parts that will be more fully hereinafter described, and particularly pointed out in the claims appended.

In the drawings, Figure 1 is a side elevation of my improved machine. Fig. 2 is a plan view thereof. Figs. 3 and 4 are detail views of the corn-dropping mechanism. Figs. 5 and 6 are detail views of the clutch employed on the driving-shaft; Fig. 7, a detail vertical sectional view showing the seed-dropping mechanism.

In the construction shown I employ a rectangular main frame $a$, and in the forward end thereof I mount the furrow-opener $b$, and to the outer side of the longitudinal beams of the frame I secure the upwardly and rearwardly inclined handles $c$. These handles are braced by the vertical bars $c'$ $c'$, the lower ends of which are secured to the main frame, and by the cross-bar $c''$, which extends across between the handles at the upper ends of the braces $c'$.

The main driving-shaft $d$ is journaled in suitable boxes secured to the under side of the longitudinal bars of the main frame to the rear of the furrow-opener $b$, and on this shaft midway between the longitudinal bars of the frame is secured the traction-wheel $e$.

A suitable distance to the rear of the driving-shaft $d$ and mounted in suitable bearings secured to the upper side of the longitudinal bar $s$ of the frame $a$ is the shaft $f$, and on this shaft is secured the stirrer-carrying wheel $g$. This wheel is solid and may be of any suitable diameter and is provided on its inner face with a series of laterally-projecting stirrer-arms $g'$. These arms $g'$ project into a circular or drum-like hopper $h$, which is secured to the inner side of one of the side bars of the main frame, the center of the shaft $f$ being about in the center of the circular part of the hopper. The inner side of this circular hopper $h$ is open, and its circular wall terminates a short distance from the inner face of the stirrer-carrying wheel, leaving a narrow space or slot $h'$ between the said wheel and the inner edge of the circular wall of the hopper, through which the cotton-seed may be discharged. The hopper $h$ is provided on its upper side with a suitable opening, through which the seed is passed into the hopper. A sprocket-wheel $i$ is secured to the shaft $f$ at one side of the stirrer-carrying wheel $g$ and is connected to a sprocket-wheel $j$, mounted on the driving-shaft $d$, by the chain $k$. The wheel $j$ is mounted loosely on shaft $d$, and is caused to revolve with the shaft by means of the clutch $l$. This clutch consists of the socket $l'$, secured to or formed integral with the wheel $j$, said socket being provided on its inner face with transverse notches or grooves $l''$. The shaft $d$, adjacent the wheel $j$, is provided at diametrically-opposite points with the radially-projecting lugs or pins $d'$, which are adapted to fit into the recesses $l''$, formed in the socket of the wheel $j$, and when engaging said recesses cause the wheel $j$ to revolve with the shaft. The wheel $j$ is normally held against the pins $d'$ by a flat spring $m$, which is secured in the forward part of the frame of the machine and bears with its free end against the inner face of the wheel $j$. In the outer surface of the socket or tubular extension of the wheel $j$ is formed an annular groove $j'$, in which the lower forked end of the lever $n$ fits. This lever extends rearwardly upwardly and is pivoted to a bracket $n^2$, secured to the inner side of the adjacent bar of the frame $a$, and terminates in a handle just above the cross-bar $c''$.

When it is desired to throw the machine out of gear when transporting it, it is only necessary to throw the upper end of the lever $n$ to the right, the lower end of the lever serving to force the wheel $j$ a sufficient distance to the left to disengage the pins $d'$ from the recesses $l''$. The upper end of the lever $n$ may be secured in its adjusted positions in the notches of a rack-bar, which may be secured on the cross-bar $c''$.

When it is desired to throw the machine into gear, it is only necessary to release the lever $n$ from the rack-bar on the cross-bar $c''$, when the spring $m$ will force the wheel $j$ against the pins $d'$, and as the shaft revolves they will catch into the recesses $l''$ and cause the wheel to turn with the shaft.

Secured in the under side of the hopper $h$, near its inner edge, is a short open-ended tube or cup $o$, the upper end of which is flush with the interior surface of the hopper, its lower end projecting a short distance below said hopper.

A circular plate $p$, secured on the end of a pivoted arm $p'$, covers the lower end of tube $o$ and is normally held over the lower end of the tube by means of a leaf-spring $p''$, carried by the hopper. A stop $p'''$, projecting upwardly from one edge of the plate $p$ and normally bearing against the side of the tube $o$, limits the movement of the plate $p$ in one direction. The arm $p'$ is extended beyond the tube $o$ and is bent upwardly at its end at right angles to the main bar, as shown at $q$ in Fig. 1, and said turned end is adapted to be engaged by the inner ends of the trip-arms $r$, which are secured to the periphery of the stirrer-carrying wheel $g$. As the wheel $g$ revolves the arms $r$ strike the upwardly-turned end $q$ of the arm $p$ and turns it on its pivot far enough to entirely uncover the lower end of the tube $o$, said arm being pivoted near the opposite side of the hopper from the tube. As plate $p$ is uncovering the lower end of tube $o$ a plate $s$, secured on the outer end of an arm $s'$, which is located in the hopper and is secured to or formed integral with the pivot of arm $p'$, said pivot extending through to the inner side of the hopper, is covering the upper end of the tube, as clearly shown in Fig. 3 of the drawings. When the trip-arms $r$ have passed the inner end $q$ of arm $p'$, the spring $p''$ returns arm $p'$ and plate $p$ to their normal positions, closing the lower end of the tube $o$, and arm $s'$ and plate $s$ are moved from the upper end of tube $o$, which permits the said tube to be again filled with seed from the hopper.

Any number of the trip-arms $r$ may be employed, and they are made detachable in order that they may be removed when the machine is used as a cotton-seed planter. These arms $r$ consist of the angle-plates, provided with perforations in one end, through which screws are passed to secure them to the wheel $g$, the other arm of the angle-plate extending across the periphery of wheel $g$ and projecting beyond its inner face a sufficient distance to engage the upwardly-turned end of the arm $p'$.

Secured to the lower ends of the rearwardly-extending downwardly-curved flat steel springs $t$ is a covering-board $t'$, these springs being secured at their upper forward ends to the under side of the side bars of the machine. When it is desired to use the machine as a cotton-seed planter, the arms $r$ are removed from wheel $g$. The tube or cup $o$ will then remain normally closed. When it is desired to use the machine as a corn-planter, the arms $r$ are placed on the wheel $g$, and the spacing of the corn is regulated by the number of arms placed on the wheel, as is evident.

The draft-pole is secured to the forward end of the machine in any suitable manner.

The stirring-wheel $g$ is adjusted on the shaft $f$ in order to adjust it close to the inner edge of the circular wall of the hopper to close the opening through which the cotton-seed falls when the machine is used as a corn-planter, if desired.

Having thus fully described my invention, what I claim, and desire to secure by Letters Patent, is—

1. In a seed-planter, the combination of a frame, a hopper carried thereby, an open-ended tube depending from its lower side, a wheel journaled on the frame alongside the hopper and provided with a series of lateral trip-arms, an arm $p'$, pivoted on the bottom of the hopper on the opposite side from the wheel, this arm being provided with a plate $p$ near its free end, its extreme end being turned upwardly alongside the open-ended tube, as at $q$, a spring $p''$, normally holding the plate $p$ over the lower end of the tube, and a pivoted arm $s'$, connected to the pivot of the arm $p'$ within the hopper and provided with a plate normally held to one side of the upper end of the tube, as and for the purposes described.

2. In a combined cotton and corn planter, the combination of a frame carrying an opener and cover, a stirrer-wheel mounted on a shaft and provided with a series of stirrer-arms for feeding cotton-seed, a hopper mounted on the frame adjacent to the wheel, the side next to the wheel being open, a series of trip-arms secured on the periphery of the wheel, a short open-ended tube secured in the bottom of the hopper, and covering-plates adapted to alternately cover the respective ends of the tube, these plates being shifted periodically for discharging seed by the trip-arms on the wheel, as and for the purpose described.

In testimony whereof I affix my signature in presence of two witnesses.

AUSTIN NEELY.

Witnesses:
 JOHN T. NEELY,
 J. M. LEWIS.